US006628106B1

(12) United States Patent
Batarseh et al.

(10) Patent No.: US 6,628,106 B1
(45) Date of Patent: Sep. 30, 2003

(54) CONTROL METHOD AND CIRCUIT TO PROVIDE VOLTAGE AND CURRENT REGULATION FOR MULTIPHASE DC/DC CONVERTERS

(75) Inventors: Issa Batarseh, Oviedo, FL (US); Wei Gu, Orlando, FL (US); Jaber Abu-Qahouq, Orlando, FL (US); Wenkai Wu, Orlando, FL (US); Hong Mao, Orlando, FL (US)

(73) Assignee: University of Central Florida, Orlando, FL (US)

( * ) Notice: Subject to any disclaimer, the term of this patent is extended or adjusted under 35 U.S.C. 154(b) by 0 days.

(21) Appl. No.: 10/206,565

(22) Filed: Jul. 26, 2002

Related U.S. Application Data

(60) Provisional application No. 60/308,731, filed on Jul. 30, 2001.

(51) Int. Cl.[7] .............................................. H02M 3/156
(52) U.S. Cl. .................... 323/222; 323/282; 323/284
(58) Field of Search ................................ 323/222, 282, 323/284, 285

(56) References Cited

U.S. PATENT DOCUMENTS

| | | | | |
|---|---|---|---|---|
| 4,417,197 | A | | 11/1983 | Schwarz ...................... 323/272 |
| 4,528,495 | A | | 7/1985 | Dorsman ..................... 323/268 |
| 4,929,882 | A | * | 5/1990 | Szepesi ....................... 323/222 |
| 5,124,629 | A | | 6/1992 | Ball et al. ................... 323/268 |
| 5,278,490 | A | | 1/1994 | Smedley ...................... 323/284 |
| 5,617,306 | A | | 4/1997 | Lai et al. ...................... 363/17 |
| 5,734,259 | A | | 3/1998 | Sisson et al. ............... 323/282 |
| 5,742,151 | A | * | 4/1998 | Hwang ........................ 323/222 |
| 5,770,940 | A | * | 6/1998 | Goder ......................... 323/282 |
| 5,798,635 | A | | 8/1998 | Hwang et al. .............. 323/222 |
| 5,804,950 | A | | 9/1998 | Hwang et al. .............. 323/222 |
| 5,808,455 | A | | 9/1998 | Schwartz et al. ........... 323/271 |
| 5,811,999 | A | | 9/1998 | Hall et al. ................... 327/156 |
| 5,825,165 | A | | 10/1998 | Kitching ...................... 323/282 |
| 5,852,558 | A | | 12/1998 | Julian ......................... 363/132 |
| 5,894,243 | A | | 4/1999 | Hwang ........................ 327/540 |
| 5,903,138 | A | | 5/1999 | Hwang et al. .............. 323/266 |
| 6,064,187 | A | * | 5/2000 | Redl et al. .................. 323/285 |
| 6,091,233 | A | | 7/2000 | Hwang et al. .............. 323/222 |
| 6,271,650 | B1 | * | 8/2001 | Massie et al. .............. 323/272 |
| 6,366,069 | B1 | * | 4/2002 | Nguyen et al. ............. 323/282 |
| 6,495,995 | B2 | * | 12/2002 | Groom et al. .............. 323/283 |
| 6,580,258 | | * | 6/2003 | Wilcox et al. .............. 323/282 |

OTHER PUBLICATIONS

Jaber A. Abu Qahouq, Jia Luo and Issa Bartarseh. Voltage Regulator Modules with Interleaved Synchronous Buck Converters and Novel Voltage–Mode–Hysteretic Control, *2001 IEEE*, pp. 972–975.

Wei Gu and Issa Batarseh, Interleaved Synchronous Buck Regulator with hysteretic voltage control, *2001 IEEE*, pp. 1512–1516.

Jaber A. Abu–Qahouq, Hong Mao and Issa Batarseh, Novel Control Method for Multiphase Low–Voltage High–Current Fast–Transient VRMs, *PESC 2002*, Jun. 2002.

J.A. Abu–Qahouq, N. Pongratananukul, I Batarseh, and T. Kasparis, Multiphase Voltage–Mode Hysteretic Controlled VRM With DSP Control and Novel Sharing, *2002 IEEE*, pp. 663–669.

* cited by examiner

Primary Examiner—Bao Q. Vu
(74) Attorney, Agent, or Firm—Brian S Steinberger; Law Offices of Brian S. Steinberger P.A.

(57) ABSTRACT

A multiphase DC/DC converter with voltage-mode hysteretic control and instantaneous current sharing functionality method and circuit. The disclosed method and circuit provides independent output voltage regulation and phases current regulation for the converter in two separate loops; one of which is concerned with voltage regulation preferably hysteretic regulation and the other which is concerned with phase current regulation. In one embodiment, each phase in the DC/DC converter is driven by a frequency divided signal derived directly from the output voltage ripple so that each phase has a switching frequency equal to the output voltage ripple frequency divided by the number of paralleled phase. In another embodiment, only the phase that carries the smallest current among a set of phases will be turned ON in each switching cycle to supply power to the output, avoiding multiple switching. Current sharing and regulation is achieved without shortening the ON time and with no multiple switching in any cycle.

25 Claims, 5 Drawing Sheets

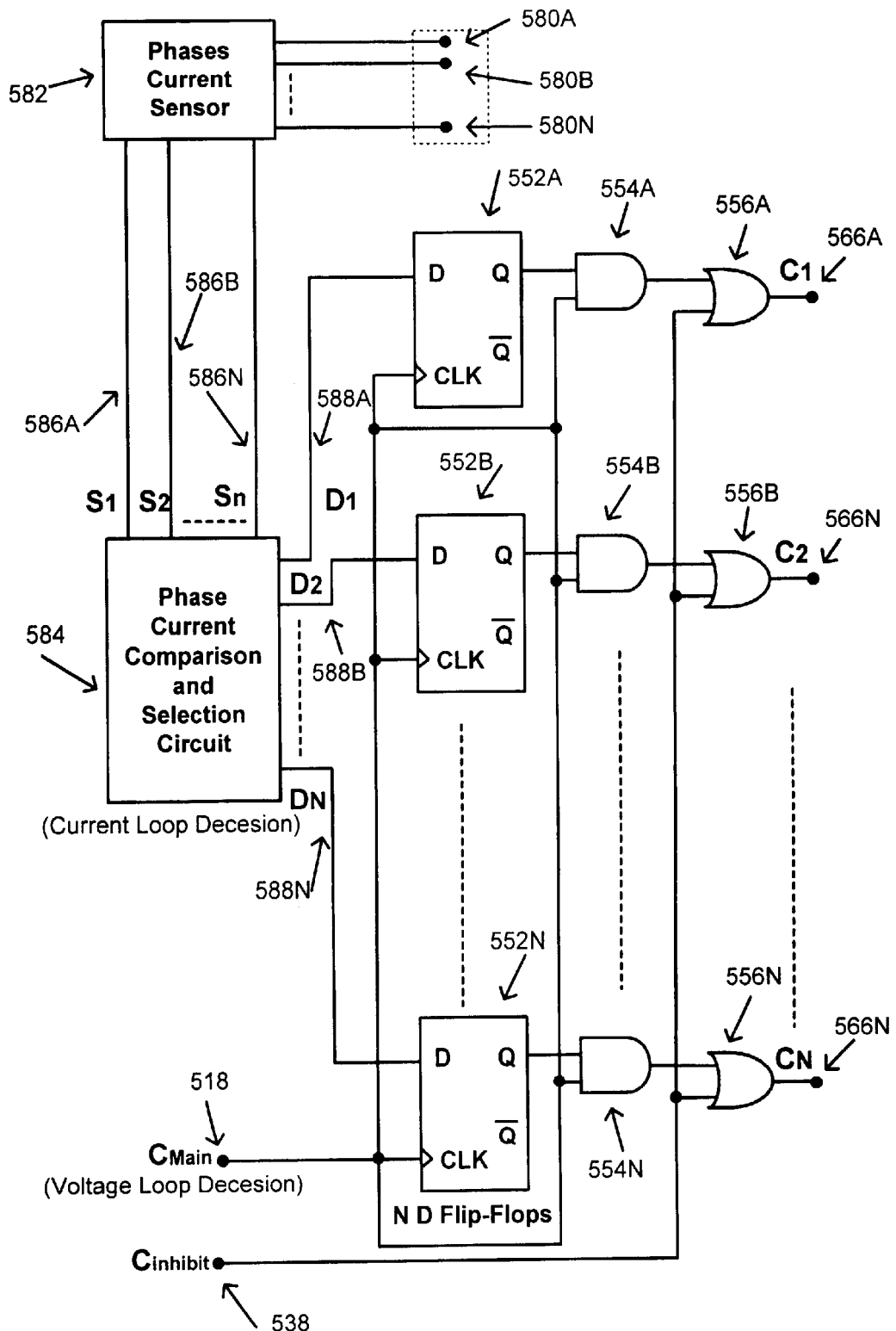
Figure (5)

CONTROL METHOD AND CIRCUIT TO PROVIDE VOLTAGE AND CURRENT REGULATION FOR MULTIPHASE DC/DC CONVERTERS

This invention claims the benefit of priority from U.S. Provisional Application Ser. No. 60/308,731 filed Jul. 30, 2001.

FIELD OF THE INVENTION

This invention is related to power supplies and more specifically DC-DC converters including the voltage regulator modules (VRMs) used in low voltage power supplies to satisfy the powering requirements of the load such as computer's microprocessors, low-voltage integrated circuits (ICs), and communication systems.

BACKGROUND OF THE INVENTION

To satisfy the power supply and dynamic requirements of today's microprocessors and related communication systems, many approaches have been discussed and proposed. Most of these prior approaches use the compensated feedback loop control system that has a main disadvantage of limited feedback loop bandwidth.

Teachings that are relevant to the background include U.S. Pat. No. 5,278,490 issued January 1994 to Smedley; and, U.S. Pat. No. 5,617,306 issued August 1997 to Lai. Also relevant are publications by: Wenkang Huang, "A New Control for Multi-phase Buck Converter with Fast Transient Response", IEEE, APEC, Anaheim, Calif., 2001, 273–279; and, K. Smedley and S. Cuk, "One-Cycle Control of Switching Converters," 22nd Annual IEEE Power Electronics Specialists Conference, Cambridge, Mass., 1991, 888–96.

Single-phase voltage-mode hysteretic control, also called "bang-bang" control or ripple regulator control, maintains the output voltage within the hysteresis band centered about an internal reference voltage. If the output voltage reaches or exceeds the reference voltage plus one-half of the hysteresis band, the controller turns OFF the high-side switch, which can be a Metal-Oxide Semiconductor Field-Effect Transistor (MOSFET), and turns ON the low-side switch, to block the energy from being transferred from the input to the output. This latter condition is the power stage OFF-state, and causes the output voltage to decrease. When the output voltage is at or below the level of the reference minus one-half of the hysteresis band, the power stage goes into ON-stage, and the controller turns ON the high-side switch, and turns OFF the low-side switch to allow energy transfer from the input to the output, which causes the output voltage to increase. This hysteretic method of control keeps the output voltage within the hysteresis band around the reference voltage. Thus, an output voltage of one volt is corrected from a deviation as small as a few millivolts as quickly as the output filter allows.

Unlike Pulse-Width Modulation (PWM) controlled power supplies, in the voltage-mode hysteretic control, the output filter design is driven primarily by the need to provide satisfactory output voltage performance in response to fast load transients encountered when supplying power to fast transient loads such as microprocessors. Hence, a smaller output capacitor is needed to provide a smaller transient voltage deviation in the voltage-mode hysteretic control compared to PWM control.

A smaller output inductor filter is desired for fast response but this leads to higher ripple, which means higher switching frequency for the switches in a hysteretic-controlled converter. High switching frequency is desired for faster transient response and smaller converter size (high power density) because of the reduction in the magnetic components size and filter. In a single module, the required switching frequency could reach such a large impractical value that the switching losses are so increased that the the overall efficiency is reduced and provokes excessive heat.

In response to the foregoing, a Multiphase (Interleave) technique is to connect the converters in parallel with phase shift of their control signals to naturally cancel the output current ripple while achieving fast response. The inductor current of the interleaved phases and sum together in a lower ripple output current. This results in a switching frequency for each module that is lower than the output voltage ripple frequency and so a higher output voltage ripple frequency can be achieved as the number of interleaved phases increases. Moreover, the effective output inductance is reduced because of the parallel configuration and hence the transient response is improved. By increasing the number of paralleled phases, higher current capability can be achieved. Thermal problem is also easier to handle in a multiphase converter.

However, when several modules are parallel, it is necessary to keep the total load current equally divided between the modules. This is currently a serious problem which must be overcome in paralleled power supply modules since the asymmetry between the phases and load transients causes the load current not to be equally divided between the modules provoking serious problems such as malfunctioning, heat, slow response, and instabilities.

SUMMARY OF THE INVENTION

It is a primary objective of this invention to provide a new control method and control circuit to provide both output voltage regulation for paralleled multiphase power supplies or converters using voltage-mode hysteretic-control.

It is a further objective of this invention to provide a current regulation property of a multiphase converts whereby the load current is equally divided or shared between the paralleled modules.

It is a still further objective of this invention to provide a low voltage power supply with the reduced low output voltage maximum deviation during steady-state and large transients operation, high output current with a high slew rate, fast transient response when the load current switches from approximately zero load to full load and vice versa, high power density, high efficiency, and high reliability.

It is an additional objective of the invention to provide a method for a controller that generates certain control signals derived from an original control signal generated from the output voltage ripple to provide the control for several paralleled converters to achieve hysteretic voltage-mode controlled and interleaved phases.

It is another objective of this invention to provide each module or phase in paralleled modules or phases with the lowest switching frequency possible and the highest possible output voltage ripple frequency whereby the output voltage ripple frequency is optimally equal to the switching frequency of each module multiplied by the number of modules.

It is a further objective of this invention to provide a method and circuit that regulates the current in each power module of phase among a set of paralleled modules or phases to achieve equal current sharing without shortening or changing the control signal (driving signal) ON time (width) and by turning one phase only each cycle to avoid multiple turn ONs within a single cycle.

It is an additional objective of this invention to provide a method and circuit that provides current sharing and regulation by sensing the instantaneous phases currents and finding the phase which carries the smallest current among set of phases to be turned ON when the voltage-mode control loop signal switches from logic low to logic high which makes possible the use of this current regulation or sharing method and circuit with any voltage-mode control method in addition to the multiphase voltage-mode hysteretic control of this invention.

A preferred embodiment of the invention is a multiphase voltage-mode hysteretic-controlled voltage regulator module comprising: an input node; an output node; reference nodes forming a hysteresis band; a feedback control circuit for interleaving two or more power stages with multiphase voltage-mode hysteretic control; and a current sharing circuit to provide equal current sharing for the paralleled multiphase power modules or phases without shortening the ON time of the switches control (driving) signals. The invention is unique in that it includes an independent hysteretic voltage-mode loop and a current sharing loop that provides one phase switch turn ON each cycle and thus avoids mutilple turn ONs in a single cycle.

The preferred method of controlling the voltage and currents in multiphase voltage-mode hysteretic-controlled voltage regulator comprises the steps of: turning ON an upper switch when the output voltage hits the hysteresis boundary or voltage limit (VL); turning ON another upper side switch the next time the output voltage hits the (VL); and so on; and, turning OFF all the upper side switches when the output voltage hits the hysteresis boundary of (VH); and turning ON all the upper side switches when the output voltage hits the boundary or limit. In another method, the phase that carries the smallest current will be turned ON each time the output voltage hits the hysteresis limit VL to regulate the current of each phase.

BRIEF DESCRIPTION OF THE FIGURES

FIG. 5 shows a current sharing circuit which provides equal current sharing of the load current between interleaved phases.

DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

It would be useful to discuss the meanings of some words used herein and their applications before discussing the novel control means of the low voltage power supply of the invention including:

Voltage-Mode Hysteretic Control—the output voltage is kept within the hysteresis band between upper and lower limits around the reference voltage;

Synchronous Buck Phases—Synchronous buck is a switching-mode DC/DC power converter which has a two switches which are synchronously driven;

Phase—each converter in a set of paralleled converters;

N Interleaved Phases—number of paralleled converters in which each converter (phase) has its drive (control) signal phase shifted with respect to the other converters;

Interleaving Control-Pulses—are control pulses which are phase shifted with respect to each other;

Main Control Signal—is the control (drive) signal which is derived directly from the output voltage ripple;

Paralleled Converters—converters connected in parallel configuration, i.e., have the same input node, the same output node, and share the same load connected to the output node;

Hysteresis Boundary—two limits around a reference point; and,

Equal Current Sharing—the load current at the multiphase (interleaved) converter output node is substantially equally divided (shared) between the paralleled modules or converters (phases).

One of the major objectives of this invention is to provide a method and circuit for a controller that produces control signals derived from a main control signal generated from the output voltage ripple to provide the control for several paralleled converters of the multiphase voltage-mode hysteretic controlled interleaved converter. This implies that the derived main control signal from the output ripple (hysteretic control) must be frequency divided while keeping the same control-signal ON-time (interleaving).

It was also noted that another major objective of this invention is to provide a method and circuit to achieve equal current sharing between the multiphase (interleaved) paralleled phases (converter modules) thereby maintaining the load current equally divided between the paralleled converters.

Figure 1:
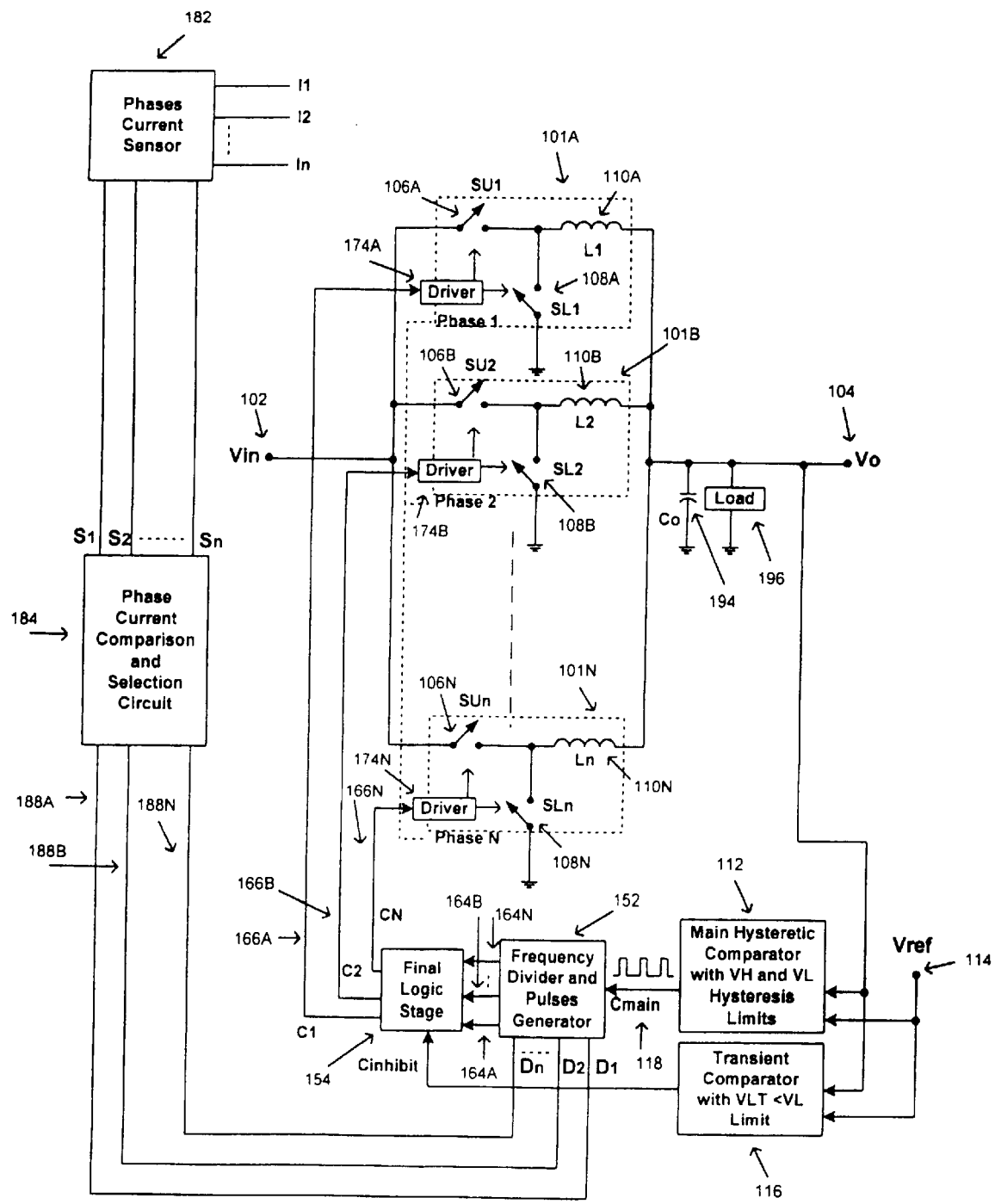
FIG. 1 shows a block diagram voltage-mode hysteretic-controlled multiphase converters with N interleaved synchronous buck phases and current sharing loop.

It would be useful to show a block diagram for the method before discussing the invention details. Reference should be made now to FIG. 1, which shows N paralleled power converter modules 101A, 101B . . . 101N with a closed loop control. Power modules 101A, 101B . . . 101N are synchronous buck modules that connected in parallel and share one input node 102 with an input voltage (Vin) and the same output node 104 with an output voltage (Vo). Each of these power modules consists of three main elements: an upper switch, a lower switch and storage element, which is shown as an inductor. For example, power module 101A consists of upper switch 106A element, lower switch 108A element, and storage element (inductor) 101A; power module 101B consists of upper switch 106B, lower switch 108B, and storage element 110B; and power module 101N consists of upper switch 106N, lower switch 108N, and storage element 110N. Each power module lower switch is complementary to the upper switch of the same module. That is, if upper switch 106A for power module 101A is closed, or turned ON, lower switch 108A will be open, or turned OFF. The same conditions apply to power modules 101B through 101N. For any power module, when any upper switch is turned ON, the output node 104 voltage (Vo) will rise, while when all upper switches are turned OFF, the output node 104 voltage (Vo) will decrease.

The output voltage (Vo) at the output node 104 is sensed across the load element 196 and the storage element 194 to the ground and fed back to the hysteretic comparator 112 (to be described in more detail later in this disclosure). The hysteretic comparator 112 is fed also by a reference voltage (Vref) at node 114 and provides logic output at node 118, which output is the main control signal (Cmain). The hysteretic comparator 112 has a hysteresis band with an upper voltage limit (VH) and lower voltage limit (VL) centered around the voltage reference (Vref) of node 114. When the output voltage (Vo) at node 104 is less than the (VL), that is less than the reference voltage (Vref) at node 114 minus half of the hysteresis band, the main control signal (Cmain) at the output node 118 of the hysteretic comparator 112 will be set high (logic one). When the output voltage at node 104 is larger than the (VH), that is larger than the reference voltage (Vref) at node 114 plus half of the hysteresis band, the main control signal (Cmain) at the output node 118 of the hysteretic comparator 112 will be set low (logic zero). It must be noted that logic high. i.e. logic one, results in turning ON one of the upper side switches 106A, 106B, . . . 106N causing the output voltage (Vo) of node 104 to increase, while logic low, i.e. logic zero, results in turning OFF all of the upper side switches 106A, 106B, . . . 106N causing the output voltage Vo of node 104 to decrease.

The main control signal (Cmain) at node 118 is then distributed between the phases switches, turning on only one upper switch each cycle when (Cmain) is logic one and turning OFF all the upper switches of the power modules when (Cmain) is logic zero. This can be done after frequency dividing (Cmain) at node 118 through element 152 which is a frequency divider generating signals at nodes 164A, 164B, . . . 164N with a lower frequency, say equal to the output voltage ripple frequency or (Cmain) frequency divided by the number of interleaved paralleled power modules (N).

To achieve equal current sharing between the paralleled modules, each power module current is sensed through element 182, which will be described later in detail, and then the sensed currents is compared by element 184 to generate the current loop signals D1, D2, . . . Dn, at nodes 188A, 188B, . . . 188N, respectively. These signals will affect element 152 frequency divided output in case of asymmetric (not equal) currents in the power modules 101A, 101B, . . . 101N to turn ON the upper switch of the appropriate power module (phase).

Element 116 is a comparator with a threshold voltage limit (VLT) which is slightly lower than the lower hysteresis limit of element 112, the hysteretic comparator, so that (VLT<VL). This comparator, element 116, has two inputs, one input from node 104, the power modules output voltage (Vo), and the other input is from node 114, the reference voltage (Vref). This comparator output is logic zero when (Vo>VLT) and has no effect on the controller operation and it is logic one when (Vo<VLT) generating an inhibition signal that turn ON all the paralleled power modules together disabling the interleaving function. The objective of this element 116 is to achieve startup and synchronization between the interleaved phases at startup and large load transients.

Control Elements 112, 116, 182, 184, and 152 are combined in a final logic circuit stage generating the final control signals C1, C2, . . . CN at nodes 166A, 166B, . . . 166N respectively to control the power modules 101A, 101B, . . . 101N ON periods and OFF periods through elements 174A, 174B, . . . 174N. Elements 174A, 174B, . . . 174N, that are called drivers here, generate a complementary signals for C1, C2, . . . CN at nodes 166A, 166B, . . . 166N respectively to control the lower switches 108A, 108B, . . . 108N, as C1, C2, . . . CN are controlling 106A, 106B, . . . 106N, respectively.

Figure 2:
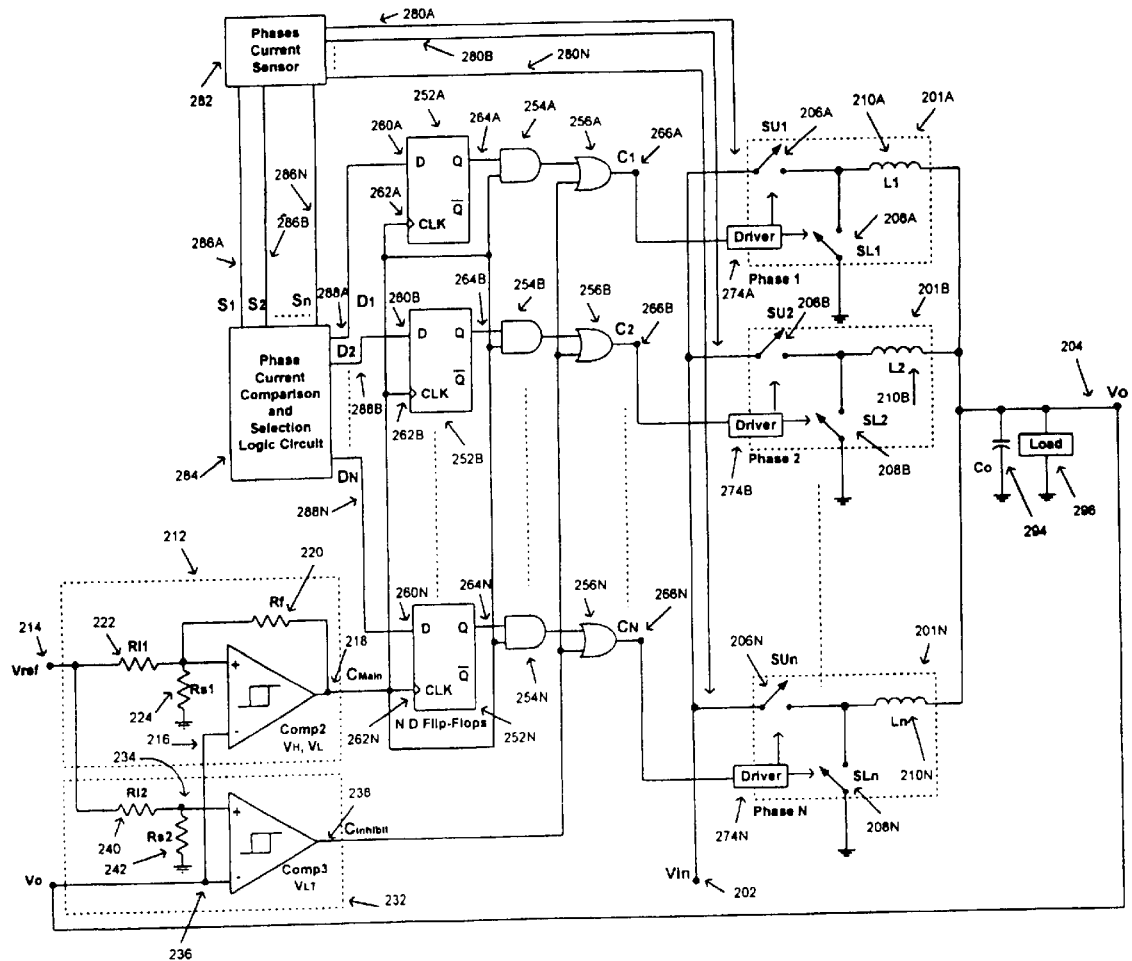
FIG. 2 shows a circuit of voltage-mode hysteretic-controlled multiphase converters with N interleaved synchronous buck phases and current sharing loop.

Reference should be made now to FIG. 2. It shows a more detailed example of a circuit which applies the control method of the invention. It must be noted that this circuit is an exemplary circuit and the invention should not be so limited.

In FIG. 2, power modules 201A, 201B, . . . 201N, are connected in parallel and to be controlled to supply a regulated output voltage (Vo) at node 204 from the input voltage (Vin) at node 202 using the multiphase (interleave) technique described earlier. At the same time, the currents of the interleaved power modules 201A, 201B, . . . 201N are regulated to be equal and to share equally the load current as described earlier. Power modules 201A, 201B, . . . 201N are controlled to supply the required regulated voltage and current through their upper and lower switches 206A, 208A, 206B, 208B, . . . 206N, 208N as described on FIG. 1 earlier by turning these switches ON and OFF.

The output voltage (Vo) is sensed at node 204, and fed back at node 236 to the comparator element 212 which consists of resistor elements 220, 222, and 224 and reference voltage (Vref) at node 214, forming a hysteresis band between upper voltage limit (VH) and lower voltage limit (VL) centered around (Vref), and output node 218. As the output voltage (Vo) at node 204 changes between comparator element 212 upper (VH) and lower (VL) limits, the logic output signal (Cmain) at node 218, switches between logic one (logic high) and logic zero (logic low). When (Vo<VL), (Cmain) output signal is logic one, and when (Vo>VH), (Cmain) outpit signal is logic zero.

The output voltage (Vo) at node 204 is also fed to the comparator element 232 at node 236. Comparator 232 circuitry consists of elements 240 and 242, a reference voltage (Vref) at node 214 generating a threshold voltage (VLT) at node 234 slightly lower than (VL) of element 212, and output node 238. When the voltage (Vo) at node 236 is larger than the voltage at node 234, the signal (Cinhibit) at node 238 is logic low and when the voltage (Vo) at node 236 is smaller than the voltage at node 234, the signal (Cinhibit) at node 238 is logic high.

Element 282 senses the currents' information from power modules 201A, 201B, . . . 201N generating S1, S2, . . . Sn at nodes 286A, 286B, . . . 286N, respectively. The currents sensed signals are then fed to module 284 that compares the phase currents and generates signals D1, D2, . . . DN at nodes 288A, 288B, . . . 288N, respectively. Only one signal among the signals D1, D2, . . . DN is logic high at a given time while the rest of them are logic low.

Elements 252A, 252B, . . . 252N are D-type flip-flops with two inputs, the D input terminals at nodes 260A, 260B, . . . 260N receiving signals D1, D2, . . . DN from nodes 288A, 288B, . . . 288N respectively, and the logic clock (CLK) input terminals at nodes 262A, 262B, . . . 262N receiving the same signal (Cmain) from node 218. The (AND) gate elements have two complementary outputs (when Q is logic high, $\overline{Q}$ is logic low, and vise versa), Q and $\overline{Q}$ at terminals 264A, 264B, . . . 264N, and 265A, 265B, . . . 265N, respectively. Terminals Q of elements 252A, 252B, . . . 252N switch to logic high at the rising edge of logic signals at (CLK) terminal if D terminals are logic high at that time, and they switch to logic low at the rising edge of logic signals at (CLK) terminal if D terminals are logic low at that time. Since only one of the signals D1, D2, . . . DN at nodes 288A, 288B, . . . 288N can be logic high at a given time, one Q of one of the D-type flip-flop elements 252A, 252B, . . . 252N can be logic high at a time while the rest are logic zero.

The (AND) gates elements 254A, 254B, . . . 254N have two inputs each, one input from Q terminals of nodes 264A, 264B, . . . 264N of the D-type flip-flops 252A, 252B, . . . 252N and the other input from (Cmain) signal at node 218 generated from the output voltage ripple at node 204, and have one output. Output terminals of the AND gates elements 254A, 254B, . . . 254N are a frequency divided version of signal (Cmain) at node 218 to be used for interleaving function to be applied to the multiphase power modules 201A, 201B, . . . 201N. The OR gate elements 256A, 256B, . . . 256N are used to inhibit the interleave functionality by (Cinhibit) signal at node 238 when (Vo<VLT) at startup and large load transients.

Assume, in steady-state operation, that the output voltage (Vo) at node 204 is decreasing because all the upper side switches 206A, 206B, . . . 206N are OFF, which means that all the lower side switches are all ON, and it hits and decrease below the hysteretic comparator (VL), causing the (Cmain) signal at node 218 to go logic high. The current comparison circuit 284 will have one of its outputs D1, D2, . . . DN, associated with the nodes 264A, 264B, . . . . 264N, logic high at that time. This will cause only one Q terminal of the D-type flip-flops to go logic high when (Vo<VL) causing one upper side switch of one of the power modules to be turned ON. Turning ON one of the upper side switches will cause the voltage (Vo) to increase until it hits the upper limit (VH) of the hysteretic comparator, causing all the upper side switches to be turned ON to decrease the voltage (Vo). This process will repeat turning ON only one high side switch when (Vo<VL) and turning OFF all high side switches when (Vo>VH) depending on the current comparison and selection logic circuit 284.

Figure 3:
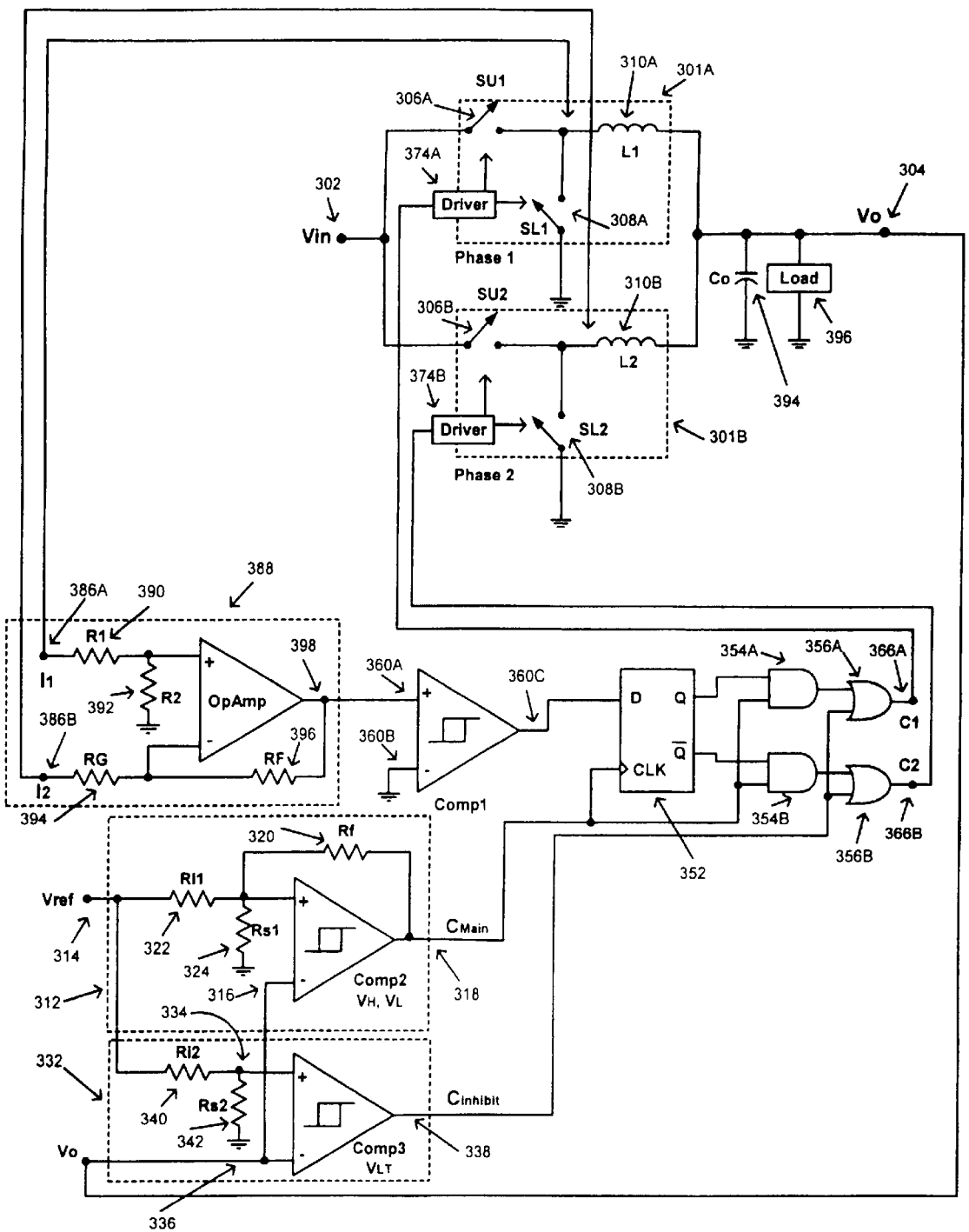
FIG. 3 shows a two phase power module with voltage-mode hystereic control and current loop with smallest current turn ON sharing method.
Figure 4:
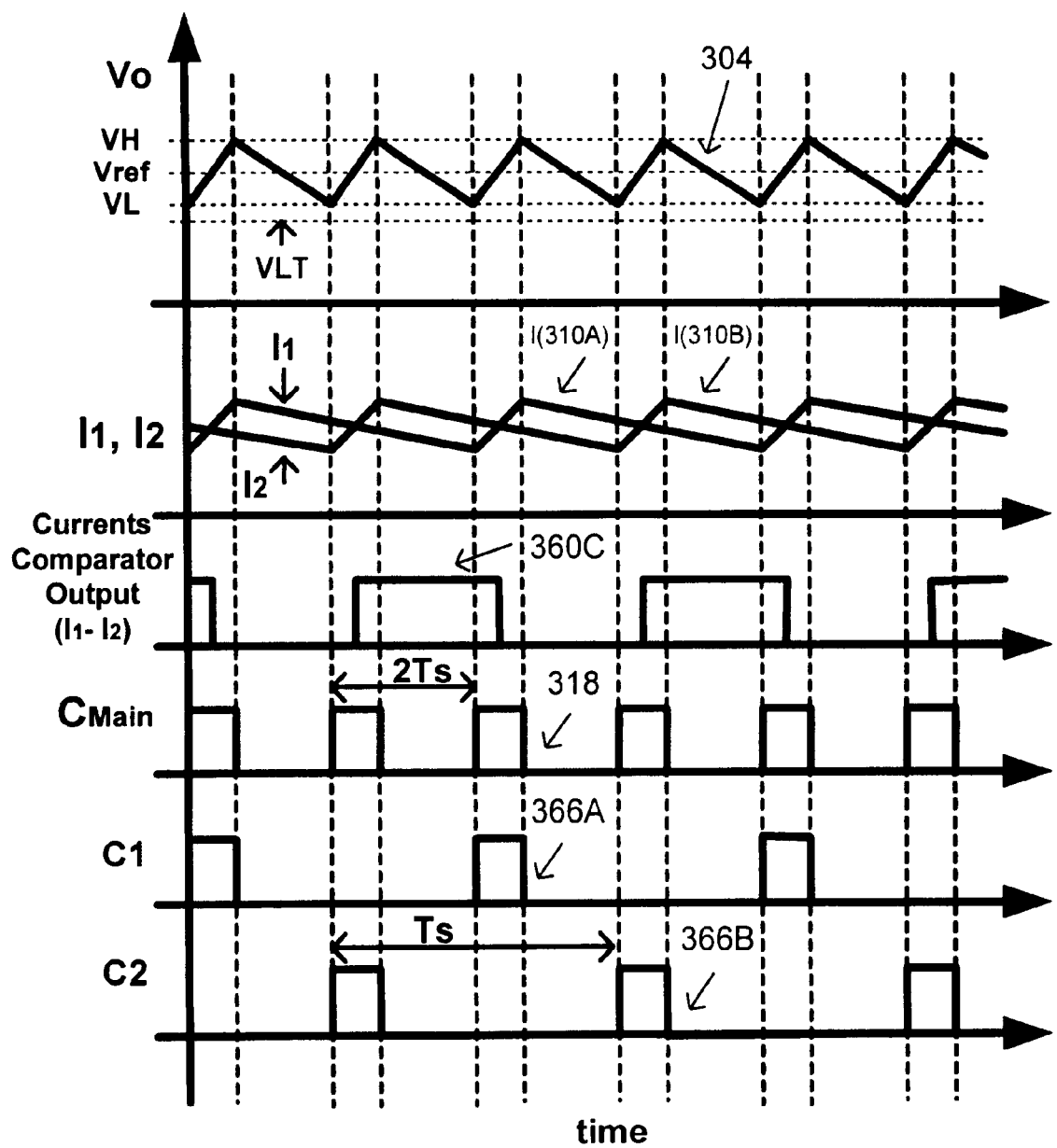
FIG. 4 shows the main waveforms from top to bottom for the two phase power module of FIG. 3 in: the output voltage waveform; the two phase inductor current waveforms; the current selection comparator output waveform; the hysteretic comparator output waveform; phase 1 control waveform; and, phase 2 control waveform.

For explanation and simplicity, FIG. 3 shows a two phase converter with two power modules interleaved using the method of the invention. This circuit is but an example of the method implementation and the invention should not be limited to this circuit. FIG. 4 shows the associated main waveforms for the circuit of FIG. 3.

Refer now to FIG. 3 where the two power modules 301A and 301B are connected in parallel and share the same input node 302 with input voltage (Vin), the same output node 304 with output voltage (Vo), the same output storage element (capacitor here) 394 and the same load 396. Each module consists of upper side switch 306A and 306B respectively, one low side switch 308A and 308B respectively, and one storage element L1 and L2 (which is inductor here) or 310A and 310B respectively.

When all the upper side switches are turned OFF, the voltage (Vo) at node 304 will decrease until it hits the hysteretic comparator 212 lower limit (VL). This hysteretic comparator 212 circuit consists of a resistive network of elements 320, 322, and 324 forming a hysteresis band with lower limit (VL) and upper limit (VH) and has two inputs, one from node 304 of(Vo) and the other from node 314 of the reference voltage (Vref).

Refer now to FIG. 4. When (Vo<VL) because of a voltage decrease, the hysteretic comparator output is logic high. As shown in FIG. 4, the currents in two of the storage elements 310A and 310B are decreasing before (Vo<VL).

The Operational Amplifier circuit 388 as shown in FIG. 3 consists of the resistive elements network 390, 392, 394, and 396, and has two input nodes 386A and 386B and one output node 398 which is the difference between the voltage at the input nodes 386A and 386B. When power module 301A (Phase 1) instantaneous current I1 is smaller than the power module 301B (Phase 2) instantaneous current I2, the operational amplifier output is lower than zero. When power module 301B instantaneous current I2 is smaller than the power module 301A instantaneous current I1, the operational amplifier output is greater than zero.

The comparator 358 compares the operational amplifier 388 output at its positive terminal 360A which is zero at its negative terminal 360B. Therefore, the comparator 358 will have logic high at its output terminal node 360C if I2<I1 causing the D terminal of the D-type flip-flop 352 to be logic high. At this case, when (Cmain) at node 318, which is connected to the CLK terminal of the D terminal of the D-type flip-flop 352, goes from logic low to logic high when (Vo<VL), the upper side switch 206B of power module 301B that caries the smallest current will be turned ON. Otherwise, if the comparator 358 has logic low at its output terminal node 360C because (I1<I2), this will cause the D terminal of the D-type flip-flop 352 to be logic low. At this case, when (Cmain) at node 318, which is connected to the (CLK) terminal of the D terminal of the D-type flip-flop 352, goes from logic low to logic high when (Vo<VL), the upper side switch 206A of power module 301A that caries the smallest current will be turned ON. This results in a circuit that will turn ON the power module or phase that carries the smallest current among the modules when the hysteretic comparator (Cmain) goes from logic low to logic high because (Vo<VL).

When one of the upper side switches 306A or 306B is turned ON, the output voltage (Vo) at node 304 will start to increase. When (Vo) hits the upper limit (VH) of the hysteretic comparator 312 (Vo>VH), (Cmain) at node 318 will go from logic high to logic low causing one input of each (AND) gate 354A and 354B to be logic low causing all the upper side switches of the power modules (phases) to be turned OFF. This results in the condition that (Vo) will start to decrease again, and so on.

During steady-state operation, as described above, the other inputs of the OR gates 356A and 356B will be logic low decided by the comparator 332 since (Vo>VLT). During transients or startup, when (Vo<VLT), one input of each the OR gates 356A and 356B will be logic high by the comparator 332 causing all the upper side switches to be turned ON. This stage will occur for a short time.

The operation of the circuit of FIG. 3 described above is more clearly understood by examination of the operational waveforms of FIG. 4. It must be noted that only one phase or power module is being turned ON each time the output voltage (Vo) hits the lower limit of the hysteretic comparator, i.e., each ripple cycle. This avoids multiple turn ONs within each ripple cycle and reduces the switching frequency needed by each phase while achieving higher ripple frequency.

This reduction of switching frequency by turning only one high side-switch each cycle represents a marked improvement over the teaching of a related recently issued U.S. Pat. No. 6,271,650 B1 to Massle, et al. entitled Method and Apparatus To Provide A DC-DC Converter with Ripple Regulation And Multiphase Current Sharing where the required switching frequency is much higher than that employed in our invention and does not have the advantage of our current sharing regulation loop with its additional benefits. The disadvantage of that Patent's disclosure occurs because the ON cycle has been shortened which results in other phases having been turned ON in the same cycle. The combination of the voltage-mode hysteretic control method and circuit with the current regulation method and circuit of our invention provides faster response, efficient conversion, and more stable system.

Moreover, equal current sharing can be realized without the hysteretic regulation circuit since the ON time of the switches is not shortened or changed to achieve current sharing. Instead, the appropriate phase is being turned ON, such as the phase which carries the smallest instantaneous current, when the voltage-mode hysteretic control loop decides that is the time to turn ON one of the upper side switches. This becomes apparent when one examines FIG. 4 from top to bottom, which shows first the output voltage waveform, then the two phase inductor current waveforms, then the current selection comparator output waveform, then the hysteretic comparator output waveform, and finally the phase 1 control waveform, and the phase 2 control waveform, respectively.

The circuitry and method of this invention which provides improved voltage and current regulation for multiphase direct current (DC) to direct current (DC) converters utilizes both a hysteric voltage regulator module and a plurality of current modules sharing a current regulation loop which is independent of the output voltage regulation loop whereby there is provided a low voltage power supply with the improved properties of low output voltage maximum deviation during steady-state and large transients operation, high output current with a high slew rate, fast transient response when the load current switches from approximately zero load to full load and vice versa, high power density, high efficiency, and high reliability.

In this invention, the current sharing regulation loop is independent of the output voltage regulation loop and booth loops have no feedback compensation.

Another novel aspect of this invention is the general current sharing method and circuit that can be extracted from FIG. 2 and is particularly shown in FIG. 5. where the phases' currents, instantaneous currents here, is being sensed from each power modules phase at nodes 580A, 580B, . . . 580N, by the current sense circuitry of module 582. The current comparison and selection module 584 receives the current sense signals 586A, 586B, . . . 586N and compares them to issue the signals D1, D2, . . . DN, at nodes 588A, 588B, . . . 588N, respectively. Only one of the signals D1, D2, . . . DN can be logic high at a time, while the rest should be logic low. For example, module 584 compares the instantaneous currents of the power module phases absolutely to each other, with no need for reference, and generate the signals D1, D2, . . . DN so that one of these signals which is associated with the phase that carries the smallest current will be logic high at a given instant.

Since these signals at nodes 588A, 588B, . . . 588N are inputs at the D terminal of the D-type flip-flops 552A, 552B, . . . 552N and the CLK inputs are from the voltage-mode loop (Cmain) at node 518, that can be voltage mode hysteretic control as described previously, or any other kind of control. When the voltage-mode control loop signal (Cmain) at node 518 goes from logic low to logic high, the Q terminal associated with the D-type flip-flop that has its D terminal logic high at that time will go logic high to turn ON the appropriate phase. Since Q terminals are logically (AND)ed with (Cmain), the ON time of the (AND) gates 554A, 554B, . . . 554N outputs will be equal to (Cmain) ON time, resulting in appropriate and correct regulation. (Cinhibit) at node 538 can be used to turn ON all the phases together using the OR gates 556A, 556B, . . . 556N when it is required such as at startup or transients.

Referring back to FIG. 3, it is apparent that modules 388, 358, 352, 354A, 354B, 356A, and 356B with (Cmain) node and (Cinhibit) node is an example of a circuit which applies the method described in FIG. 5.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:
1. A Multiphase DC/DC converter comprising:
   (a) an input node with an input voltage (Vin);
   (b) an output node with an output voltage (Vo);
   (c) a plurality of power modules each having an upper switch, a lower switch and a storage element;
   (d) a hysteretic comparator with an upper limit (VH) and a lower limit (VL) forming a hysteresis band around a reference voltage (Vref) thus providing an output voltage regulation loop;
   (e) another comparator with a threshold limit (VLT) slightly lower than the hysteretic comparator lower limit (VL);
   (f) a current sensing circuit that senses the current in each phase;
   (g) a current comparison and selection circuit providing a current sharing regulation loop; and,
   (h) a final stage logic circuit whereby the current sharing regulation loop is independent of the output voltage regulation loop.

2. The Multiphase DC/DC converter according to claim 1 wherein the storage element of each power modules is an inductor and has a capacitor connected to the output node as a storage filter element.

3. The Multiphase DC/DC converter according to claim 1 comprising:
   means for providing that when the upper switch of any phase is ON, the lower switch for the same phase will be OFF and vice versa.

4. The Multiphase DC/DC converter according to claim 1 wherein the power modules are connected in parallel and share the same input node and output node.

5. The Multiphase DC/DC converter according to claim 1 comprising:
   means for providing that when at least one of the upper switches is ON, power will be delivered from the input to the output causing the output voltage at the output node to increase.

6. The Multiphase DC/DC converter according to claim 1 comprising:
   means for providing that when all the upper side switches in claim 1 are OFF, power will not be delivered from the input to the output and therefore causing the output voltage at the output node to decrease.

7. The Multiphase DC/DC converter according to claim 1 wherein the hysteretic comparator, another comparator, the current sense circuit, the current comparison and selection circuit, and the final logic stage form two independent feedback control loops to regulate both the output voltage and phases currents.

8. The Multiphase DC/DC converter according to claim 7 wherein the hysteretic comparator comprises:
(a) two input nodes fed by a reference voltage (Vref) and the output voltage (Vo) from the output node; and
(b) a positive feedback circuit forming a hysteresis band with upper limit (VH) and lower limit (VL) centered around the Vref.

9. The Multiphase DC/DC converter according to claim 8 wherein the hysteretic comparator includes:
means for providing a logic high output when the output voltage (Vo) is less than the hysteretic comparator lower limit (VL) setting the order to turn one of the upper side switches ON to deliver power to the output and also a logic low output when the output voltage (Vo) is larger than the hysteretic comparator upper limit (VH) setting the order to turn all the upper side switches OFF.

10. The Multiphase DC/DC converter according to claim 8 comprising:
means providing that each time the output voltage at the output node hits the lower limit (VL), only one of the upper side switches is turned ON to deliver power to the output which will cause the output voltage to increase resulting in only a single switching in each cycle.

11. The Multiphase DC/DC converter according to claim 8 comprising:
means for providing that each time the output voltage (Vo) hits the hysteretic comparator lower limit (VH), all the upper side switches are turned OFF increasing the output voltage.

12. The Multiphase DC/DC converter according to claim 8 comprising:
means for turning ON only one upper side switch during each cycle which results in a higher output voltage ripple frequency than the switching frequency of each phase.

13. The Multiphase DC/DC converter according to claim 10 wherein said another comparator includes:
means to turn ON all the upper side switches at startup and during large load transients when (Vo<VLT).

14. The Multiphase DC/DC converter according to claim 1 wherebin the current comparison and selection circuit has a number of outputs equal to the number of the paralleled phases with means for providing that only one output can be logic high at a given time thereby indicating to the phase that its upper switch should be turned ON.

15. The Multiphase DC/DC converter according to claim 14 including:
means to select the phase that is to turned ON when said phase is carrying the smallest instantaneous current at the time when the hysteretic comparator switches to logic high in response to the output voltage (Vo) dropping below the lower hysteresis limit (VL).

16. The Multiphase DC/DC converter according to claim 15 further comprising:
means for providing equal current sharing between the phases by regulating the current in each phase while regulating the output voltage (Vo) at the same time using the multiphase voltage-mode hysteretic control.

17. A method of maintaining current sharing independent of the voltage control of a DC/DC multiphase converter during transient conditions comprising the steps of:

(a) providing at least two current switching phases;
(b) having a steady state operating range;
(c) sensing the current in each phase;
(d) determining the phase having the smallest current value; and,
(e) activating a switch in the phase having the smallest current value thereby maintaining equal current sharing of the load current between the phases thereby resulting in a lower output current ripple.

18. The method according to claim 17 wherein substantially equal currents in each phase is maintained during large load changes (transient conditions).

19. The method according to claim 17 wherein substantially equal currents in each phase are maintained at an immediate power demand change.

20. A method of improving the transient response to hysteretic voltage control of a DC/DC multiphase power supply across a load comprising:
(a) providing hysteretic control of the output voltage (Vo) by means of a voltage sensing loop;
(b) providing at least two switching phase phases;
(c) sensing the current level in each phase;
(d) activating the one of the switching phases with the smallest current value; and,
(e) turning on one switch per phase cycle whereby the ripple frequency of the output voltage is increased while maintaining lower switching frequency per phase.

21. The method according to claim 20 wherein said transient response is an output power demand change.

22. The method according to claim 20 wherein said transient response is a rapid voltage response across the load.

23. The Multiphase DC/DC converter according to claim 1 comprising:
means for providing that each time the output voltage at the output node hits the lower limit (VL) only one of the upper side switches is turned ON to deliver power to the output which causes the output voltage (Vo) to increase resulting in only a single switching in each cycle.

24. A Multiphase DC/DC converter comprising:
(a) hysteretic comparator which provides a logic high output when the output voltage (Vo) is less than the hysteretic comparator lower limit (VL) setting the order to turn one of the upper side switches ON to deliver power to the output; and,
(b) three parallel current phases.

25. A Multiphase DC/DC converter comprising:
(a) a voltage comparator having two inputs fed by a reference voltage (Vref) and an output node providing a voltage (Vo) with circuitry means providing that each time the output voltage at the output node hits a predetermined lower limit-VL, only one of the upper side switches is turned ON to deliver power to the output which will cause the output voltage (Vo) to increase resulting in only a single switching in each cycle;
(b) a separate current sensing circuit that senses the current in each phase;
(c) a current comparison and selection circuit; and
(d) said current circuits providing a multiphase current control loop independent of any voltage mode control circuit.

* * * * *